Dec. 12, 1939. W. F. DREW 2,183,236

BAKE OVEN

Filed Oct. 18, 1938 2 Sheets-Sheet 1

INVENTOR.

William F. Drew

Dec. 12, 1939.  W. F. DREW  2,183,236
BAKE OVEN
Filed Oct. 18, 1938  2 Sheets-Sheet 2
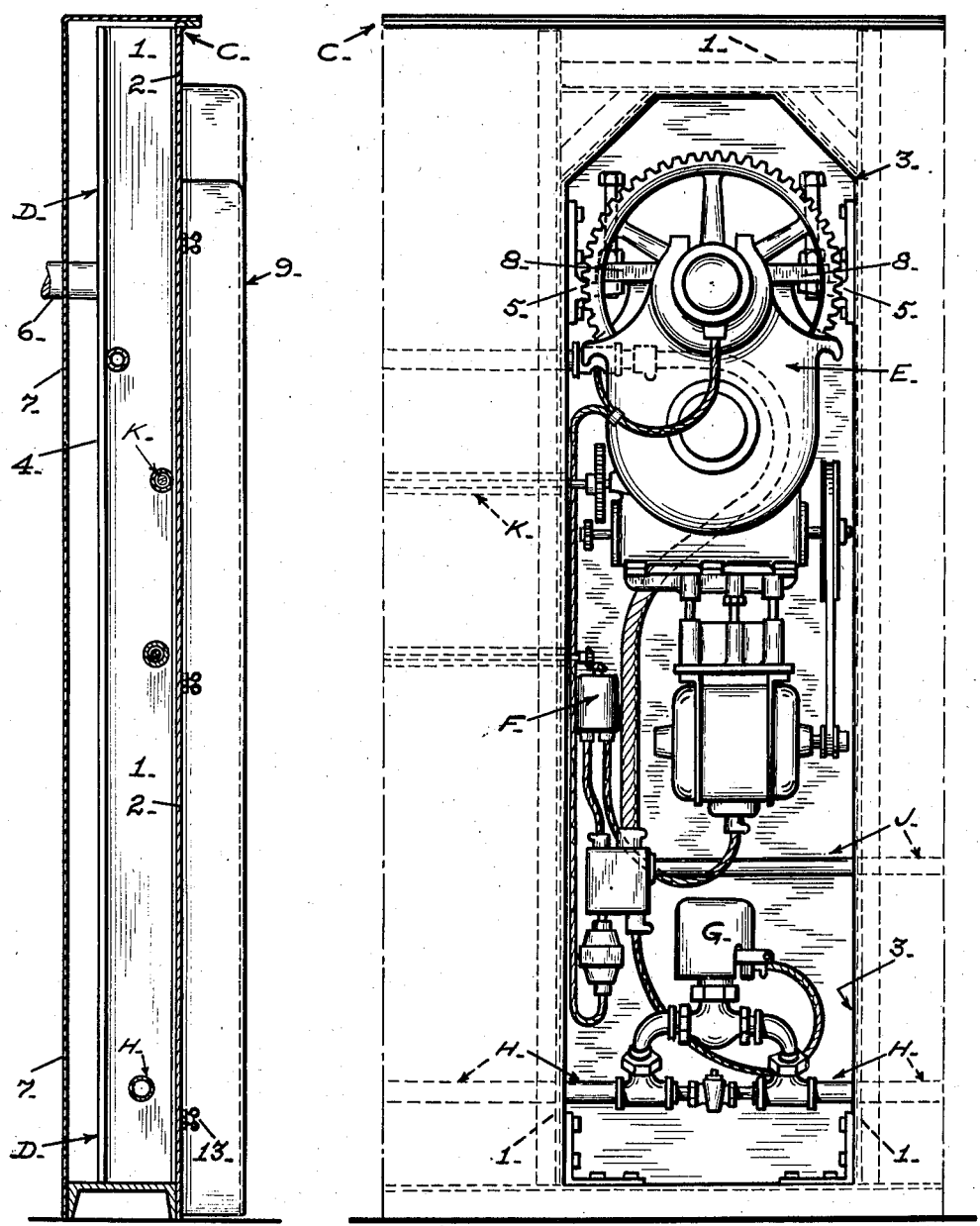
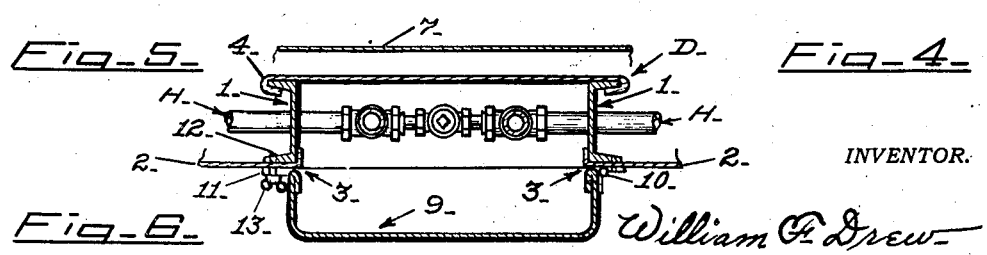
Fig. 5.  Fig. 4.
Fig. 6.
INVENTOR.
William F. Drew Patented Dec. 12, 1939

2,183,236

UNITED STATES PATENT OFFICE 2,183,236

BAKE OVEN

William F. Drew, Los Angeles, Calif., assignor to Bakers & Confectioners Supply Co. of California, Los Angeles, Calif.

Application October 18, 1938, Serial No. 235,703

9 Claims. (Cl. 107—59)

This invention relates to improvements in bake ovens, particularly the reel type, and has for its primary object the provision of a new and useful sheet metal, double-walled end unit for an oven casing, for the purpose of conveniently housing and concealing the operating and control means, other elements and parts which heretofore were disposed exteriorly of the end of the oven casing in an objectionably space consuming and unsightly arrangement.

An object of the invention is to provide a double-walled oven casing end construction of the character described wherein the inner and outer sheet metal walls thereof are spaced apart for reception of insulation material and the outer wall is provided with a sheet metal housing structure which extends into the space between the walls but is spaced from the inner wall to prevent heat conductivity and in which housing a motor operated drive means and other control and operating devices are housed and concealed whereby to eliminate the objectionable disposition of such means and devices on the exterior of the oven.

A further object is to provide an end construction for an oven casing wherein the spaced inner and outer sheet metal walls having insulation therebetween as hereinbefore described, partly encloses and insulates a sectional housing which in turn encloses the drive means and other parts as aforesaid, said sectional housing including an inner section which is disposed between the said walls and secured to the outer wall about the margin of an opening in the latter, with its inner side spaced from said inner wall and an outer section which is hinged or otherwise attached to the outer side of said outer wall as a covering for said opening and which with the inner section forms a readily openable and accessible enclosure for the aforesaid operating and control means for the oven.

With the above and other objects in view the invention consists in the novel construction and combination of parts hereinafter described, illustrated in the accompanying drawings, and set forth in the claims hereto appended, it being understood that various changes in form, proportion, size and minor details of construction within the scope of the claims may be resorted to without departing from the spirit or sacrificing any of the advantages of the invention.

Referring to the drawings:

Figure 4 is an enlarged fragmentary end elevation of the oven, with the cover section of the housing removed.

Figure 5 is a sectional view taken on the plane of line 5—5 of Figure 1.

Figure 6 is an enlarged cross sectional view taken on the plane of line 6—6 of Figure 1.

Figure 1:
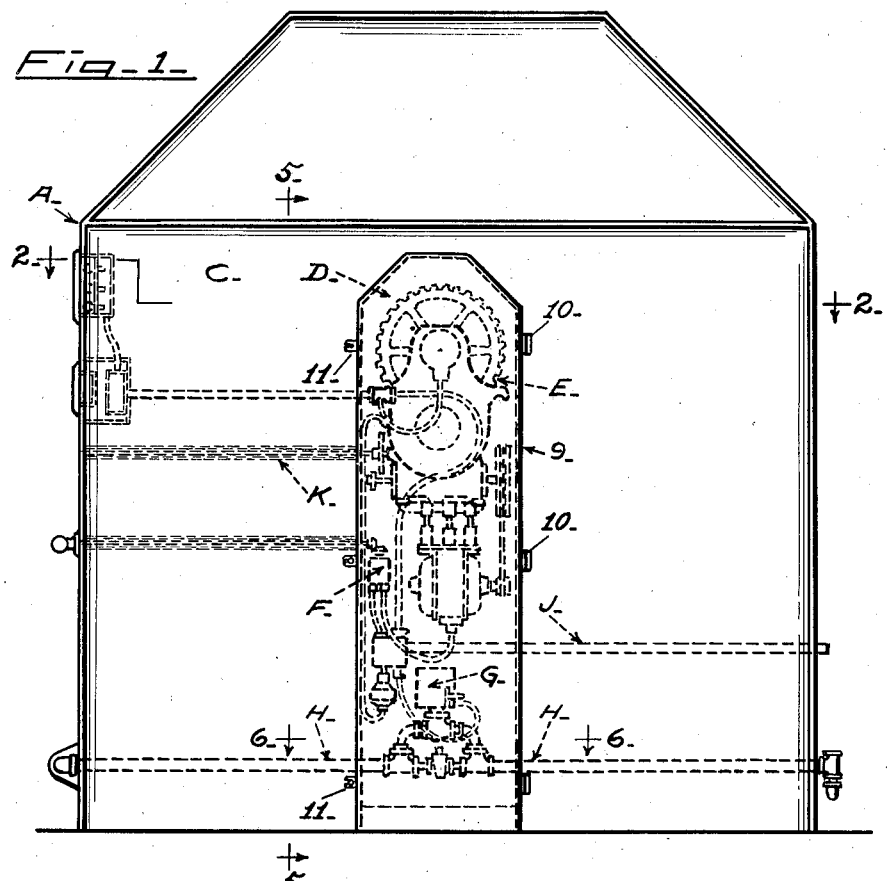
Figure 1 is an end elevation of a bake oven constructed in accordance with this invention.
Figure 2:
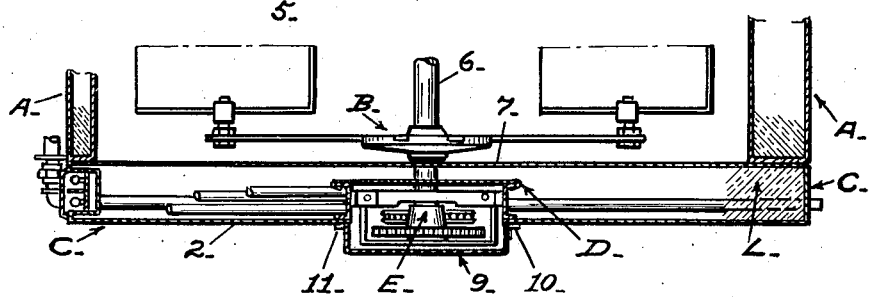
Figure 2 is a sectional view taken on the plane of line 2—2 of Figure 1 with most of the thermal insulation omitted, for clarity of illustration.
Figure 3:
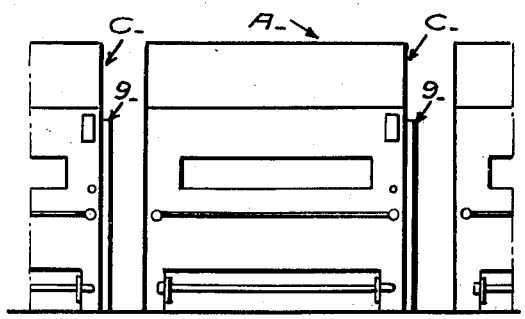
Figure 3 is a fragmentary front elevation of a battery of ovens of this invention illustrating the usual manner of setting the oven units end to end.

One embodiment of this invention as shown in the reel oven illustrated in the accompanying drawings, generally comprises an oven casing A, a reel B therein, a sheet metal thermally insulated double-walled end unit or section C for said casing, a sectional sheet metal housing structure D which may be described as being "embedded" in said double-walled end unit, and various control and other elements mounted between the inner and outer walls of said double-walled unit and also within said housing such for example, as a combined hand and motor-operated reel driving unit E, switch F and fuel control valve G in the said housing and the fuel conduits H, electric conduit J and manual drive shaft K, et cetera, mounted in the space between said inner and outer walls.

In accordance with this invention the double wall end unit C is a pre-filled insulation section of sheet steel containing thermal insulation as shown at L and wherein an inner section of the housing D is provided by means of a rectangular frame 1 of steel channels rigidly secured in any suitable manner to the inner side of the outer wall 2 of said end unit about the margins of a similarly shaped opening 3 in said wall, and a plate 4 extending between and crimped around flanges of the channels of said frame to serve as the back wall of said inner section.

As here shown brackets 5 bolted to the side channels of the frame 1, support the drive unit E, the shaft 6 of the reel B being extended through the inner wall 7 of the unit C and operatively associated with said drive unit in any suitable manner. It should be noted that the entire drive unit and the end of the shaft 6 are flexibly supported on said brackets for wear and other compensating movement relative to the housing D, due to the suspension of the upper end of the drive unit from the brackets 5 by means of the arms 8 extending laterally from the drive unit and the manner of connection thereof with the brackets as shown in Figure 4.

The other elements in the housing D are supported in any suitable manner it being noted that the side channels of the frame 1, Figure 5, are suitably apertured for connection of the parts H, J, K, etc., with said elements.

It will now be seen that the double wall end unit is in effect provided with a recess for enclosing the drive unit E and other elements associated therewith also the switch F, valve G, etc., and that these parts will be protected from the oven heat by the thermal insulation and the fact that the frame 1 and rear or inner wall of the inner housing section are spaced from the inner wall 7 of the end unit C, and the space therebetween packed with insulation material.

As here provided an outer section 9 of the housing D serves as a cover and is preferably hinged as at 10 to the outer side of the outer wall 2 along one side margin of the opening 3 therein. This outer or cover section registers with the opening 3 and inner section and is of rectangular cross section so that it provides an enclosing space outwardly of the outer wall 2, for enclosing those portions of the drive unit and other parts which project outwardly from the opening 3.

Suitable fastenings such as the slotted members 11 on the outer section, stud bolts 12 extending from the outer wall 2 and the wing nuts 13 provide for releasably securing the outer section in closed position yet afford a ready opening of the said section on its hinges to permit of access to the said contents of the housing.

It should be noted that due to the recessed mounting of the oven drive unit and various oven control elements the enclosure, within the outer wall of the oven, of said electrical and fuel conduits and more particularly the simple, straight line means for manual operation of the oven drive and electrical switch control is made possible. Further such disposition of the said parts directly simplifies the mounting of the manual controls and indicating devices on the accessible front wall of the oven in contradistinction to mounting of such parts on the end wall inconvenient for operation when oven units are set end to end in battery formation. Moreover, by said disposition of parts damage thereof as well as the unsightly exposure of conduits, piping, valves, etc. is eliminated and the oven structure improved thereby.

I claim:

1. In a bake oven, an oven casing having a double-walled end section including inner and outer sheet metal walls spaced apart and containing therebetween thermal insulation, and a sheet metal housing embedded in said double-walled section and spaced from contact with the inner wall thereof and adapted to enclose operating and control elements for the oven.

2. In a bake oven, an oven casing having a double-walled end section including inner and outer sheet metal walls spaced apart and containing therebetween thermal insulation, and a sheet metal housing embedded in said double-walled section and spaced from contact with the inner wall thereof and adapted to enclose operating and control elements for the oven, said housing including an inner section secured to the inner side of the outer wall, and an outer section secured to the outer side of the outer wall and extending outwardly therefrom.

3. In a bake oven, an oven casing having a double-walled end section including inner and outer sheet metal walls spaced apart and containing therebetween thermal insulation, and a sheet metal housing embedded in said double-walled section and spaced from contact with the inner wall thereof and adapted to enclose operating and control elements for the oven, said housing including an inner section fixed between said walls, said outer wall having an opening therein registering with said inner section, and an outer section hinged to said outer wall in registration with said opening and inner section.

4. In a bake oven, an oven casing having a double-walled end section including inner and outer sheet metal walls spaced apart and containing therebetween thermal insulation, and a sheet metal housing embedded in said double-walled section and spaced from contact with the inner wall thereof and adapted to enclose operating and control elements for the oven, said housing including an inner section secured to the inner side of the outer wall, and an outer section secured to the outer side of the outer wall and extending outwardly therefrom, and other oven parts mounted in the space between said walls and extending into said housing.

5. In a bake oven, a reel, an oven casing enclosing said reel and having a double-walled end section including inner and outer sheet metal walls spaced apart and containing insulation material therebetween, a housing section carried by said outer wall between the two walls and spaced from the inner wall, oven parts in said space between said walls and extended into said housing section and a drive unit for said reel and other oven elements mounted in said housing section, and operatively connected therein with said first named oven parts, said outer wall having an opening therein in registration with said opening.

6. In a bake oven, a reel, an oven casing enclosing said reel and having a double-walled end section including inner and outer sheet metal walls spaced apart and containing insulation material therebetween, a housing section carried by said outer wall between the two walls and spaced from said inner wall, oven parts in said space between said walls and extended into said housing section, and a drive unit for said reel and other oven elements mounted in said housing section, and operatively connected therein with said first named oven parts, said outer wall having an opening therein in registration with said opening, an outer housing section mounted exteriorly of and on said outer wall and serving as a closure for said opening.

7. In a bake oven, a reel, an oven casing enclosing said reel and having a double-walled end section including inner and outer sheet metal walls spaced apart and containing insulation material therebetween, a housing section carried by said outer wall between the two walls and spaced from said inner wall, oven parts in said space between said walls and extended into said housing section, and a drive unit for said reel and other oven elements mounted in said housing section, and operatively connected therein with said first named oven parts, said outer wall having an opening therein in registration with said opening, an outer housing section mounted exteriorly of and on said outer wall and serving as a closure for said opening, and receiving therein portions of the parts enclosed in said inner section.

8. In a bake oven, a reel, an oven casing enclosing said reel and having a double-walled end in which inner and outer sheet metal walls are spaced apart for insulation material and the outer wall is provided with an opening, and metal members fixed to the interior of said outer wall adjacent said opening and spaced from said inner wall and defining with the double-walled end a recess in registration with said opening and adapted to protectively house operating and control elements of the oven.

9. In a bake oven, a reel, an oven casing enclosing said reel and having a double-walled end in which inner and outer sheet metal walls are spaced apart for insulation material and the outer wall is provided with an opening, and metal members fixed to the interior of said outer wall adjacent said opening and spaced from said inner wall and defining with the double-walled end a recess in registration with said opening and adapted to protectively house operating and control elements of the oven, and a closure section secured upon the exterior of the outer wall and extending outwardly therefrom and serving as an outer recess and as a closure for said opening.

WILLIAM F. DREW.